US010050574B2

(12) United States Patent
Colangelo et al.

(10) Patent No.: US 10,050,574 B2
(45) Date of Patent: Aug. 14, 2018

(54) MANAGEMENT OF MOTOR REGENERATION

(71) Applicant: The Boeing Company, Chicago, IL (US)

(72) Inventors: Kevin T. Colangelo, Glendora, CA (US); Douglas Conrad Cameron, Ladera Ranch, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/148,562

(22) Filed: May 6, 2016

(65) Prior Publication Data

US 2017/0324362 A1 Nov. 9, 2017

(51) Int. Cl.

| | |
|---|---|
| ***H02P 6/182*** | (2016.01) |
| ***G01R 31/36*** | (2006.01) |
| ***H02P 6/08*** | (2016.01) |
| ***H02P 23/14*** | (2006.01) |
| ***H02P 23/00*** | (2016.01) |
| ***B60L 3/12*** | (2006.01) |
| ***H02P 27/08*** | (2006.01) |
| ***H02M 1/32*** | (2007.01) |
| ***H02M 7/797*** | (2006.01) |
| ***H02P 3/14*** | (2006.01) |

(52) U.S. Cl.

CPC ................ *H02P 23/14* (2013.01); *B60L 3/12* (2013.01); *H02M 1/32* (2013.01); *H02M 7/797* (2013.01); *H02P 3/14* (2013.01); *H02P 23/0077* (2013.01); *H02P 27/08* (2013.01); *B60L 2240/526* (2013.01)

(58) Field of Classification Search

CPC ............. B60L 7/26; H02P 6/182; H02P 6/085

USPC ........................................................ 324/772

See application file for complete search history.

(56) References Cited

U.S. PATENT DOCUMENTS

| | | | |
|---|---|---|---|
| 5,038,092 | A | 8/1991 | Asano et al. |
| 5,416,885 | A | 5/1995 | Sakoh |
| 5,497,326 | A | 3/1996 | Berland et al. |

(Continued)

FOREIGN PATENT DOCUMENTS

| | | | | |
|---|---|---|---|---|
| JP | 61116905 A * | 6/1986 | ................ B60L 7/14 |
| WO | WO2015194013 A1 | 12/2015 | |

OTHER PUBLICATIONS

Office Action, dated Apr. 28, 2017, regarding U.S. Appl. No. 15/148,459, 30 pages.

(Continued)

*Primary Examiner* — Jorge L Carrasquillo
*Assistant Examiner* — Cortez Cook
(74) *Attorney, Agent, or Firm* — Yee & Associates, P.C.

(57) ABSTRACT

A method and apparatus for controlling regeneration for a motor. An instantaneous voltage provided by a power supply to the motor is identified using a voltage signal received from a voltage sensor. A new average voltage is computed for the motor using the instantaneous voltage, a previously computed average voltage, and a weight factor for the instantaneous voltage. A difference between the new average voltage and the instantaneous voltage is compared to a selected threshold to determine whether a regeneration condition exists. Operation of the motor is controlled such that a duty cycle of the motor does not decrease in response to a determination that the regeneration condition exists.

16 Claims, 5 Drawing Sheets

(56) References Cited

U.S. PATENT DOCUMENTS 6,055,389 A * 4/2000 Takahashi .......... G03G 15/1675 399/313
6,424,798 B1 7/2002 Kitamine
6,433,502 B2 * 8/2002 Oku ........................ H02P 6/085 318/400.33
6,462,491 B1 10/2002 Iijima et al.
9,742,341 B2 8/2017 Watabu et al.
2008/0231217 A1 9/2008 Zhong et al.
2009/0033357 A1 * 2/2009 Lindsey ............... H02H 7/0855 324/765.01
2010/0192788 A1 8/2010 Tanaka et al.
2011/0037423 A1 2/2011 Koda et al.
2011/0187308 A1 * 8/2011 Suhama .................. H02P 27/04 318/798
2012/0013280 A1 * 1/2012 Kern ....................... H02P 6/182 318/400.04
2013/0063055 A1 * 3/2013 Araki .................. B60L 11/1801 318/376
2014/0265967 A1 9/2014 Brown et al.
2015/0006933 A1 * 1/2015 Park .......................... B60L 3/12 713/323
2015/0180389 A1 * 6/2015 Ogawa .................... H02P 6/182 318/400.34
2015/0202966 A1 * 7/2015 Oyama ................. B60L 3/0046 701/22
2015/0333669 A1 * 11/2015 Alexander ............. H02P 29/02 318/599
2016/0065073 A1 3/2016 Katsuki et al.

OTHER PUBLICATIONS

Keeping "Controlling Sensorless, BLDC Motors via Back EMF," Contributed by Electronic Products, Digi-Key Electronics, Jun. 19, 2013, 6 pages, accessed May 4, 2016, http://www.digikey.com/en/articles/techzone/2013/jun/controlling-sensorless-bldc-motors-via-back-emf.
Cameron et al., "Method and Apparatus for Adjusting Motor Commutation Phase and Period," U.S. Appl. No. 15/148,459, filed May 6, 2016, 44 pages.
Final Office Action, dated Nov. 17, 2017, regarding U.S. Appl. No. 15/148,459, 36 pages.
Extended European Search Report, dated Sep. 14, 2017, regarding Application No. EP17167159.7 , 6 pages.

* cited by examiner

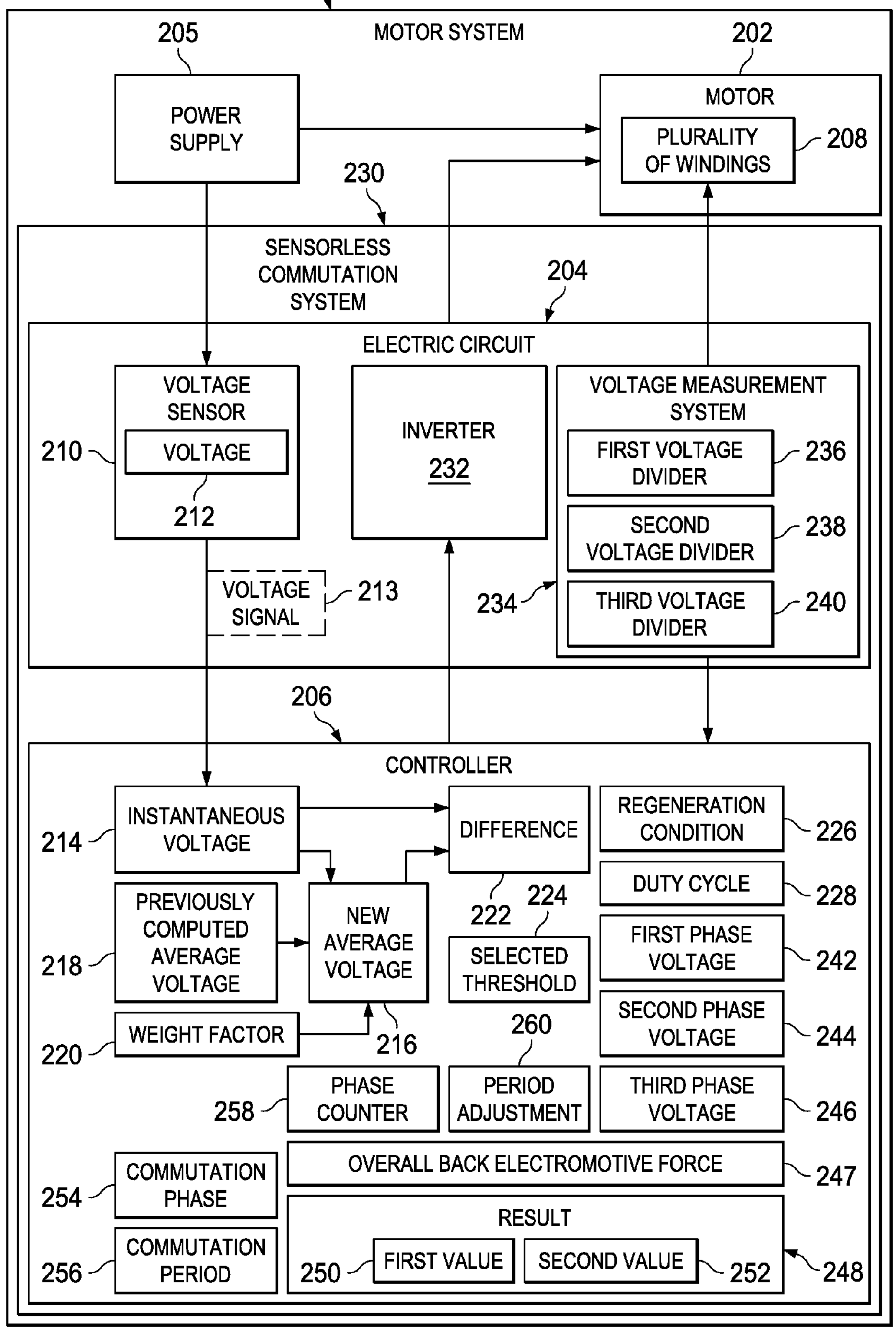
FIG. 2
200
MOTOR SYSTEM
205
POWER SUPPLY
202
MOTOR
PLURALITY OF WINDINGS
208
230
SENSORLESS COMMUTATION SYSTEM
204
ELECTRIC CIRCUIT
VOLTAGE SENSOR
210
VOLTAGE
212
INVERTER
232
VOLTAGE MEASUREMENT SYSTEM
FIRST VOLTAGE DIVIDER
236
SECOND VOLTAGE DIVIDER
238
THIRD VOLTAGE DIVIDER
240
234
VOLTAGE SIGNAL
213
206
CONTROLLER
INSTANTANEOUS VOLTAGE
214
DIFFERENCE
REGENERATION CONDITION
226
DUTY CYCLE
228
PREVIOUSLY COMPUTED AVERAGE VOLTAGE
218
NEW AVERAGE VOLTAGE
216
222
224
SELECTED THRESHOLD
FIRST PHASE VOLTAGE
242
SECOND PHASE VOLTAGE
244
WEIGHT FACTOR
220
260
PHASE COUNTER
258
PERIOD ADJUSTMENT
THIRD PHASE VOLTAGE
246
OVERALL BACK ELECTROMOTIVE FORCE
247
COMMUTATION PHASE
254
COMMUTATION PERIOD
256
RESULT
FIRST VALUE
250
SECOND VALUE
252
248

MANAGEMENT OF MOTOR REGENERATION

BACKGROUND INFORMATION

1. Field

The present disclosure relates generally to electric motors and, in particular, to electric motor regeneration. Still more particularly, the present disclosure relates to a method and apparatus for managing regeneration to improve overall electric motor performance.

2. Background

Electric motors may be operated at different speeds in various electromechanical systems. In some cases, when an electric motor is operated at high speeds, a state of regeneration occurs. Regeneration occurs when a sudden decrease in the load required by an electric motor causes the current to reverse and flow back into the power supply of the motor. The power supply may be, for example, a battery, a system of batteries, or some other type of power supply. The flow of current back into the power supply may cause an overvoltage that may have an undesired effect on the power supply, reduce a performance of the power supply, or prevent the power supply from being able to supply power to the electric motor. Consequently, regeneration may reduce an overall performance of the electric motor.

Regeneration typically occurs in response to or during reductions in duty cycle of an electric motor, changes in load, or both. Some currently available methods for managing regeneration use hardware components such as, for example, without limitation, a shunt resistor and a voltage comparator circuit. However, these hardware components may increase the weight of the electric motor more than desired. Further, these hardware components may increase the overall cost of the electric motor more than desired. Therefore, it would be desirable to have a method and apparatus that take into account at least some of the issues discussed above, as well as other possible issues.

SUMMARY

In one illustrative embodiment, a method is provided for controlling regeneration for a motor. An instantaneous voltage provided by a power supply to the motor is identified using a voltage signal received from a voltage sensor. A new average voltage is computed for the motor using the instantaneous voltage, a previously computed average voltage, and a weight factor for the instantaneous voltage. A difference between the new average voltage and the instantaneous voltage is compared to a selected threshold to determine whether a regeneration condition exists. Operation of the motor is controlled such that a duty cycle of the motor does not decrease in response to a determination that the regeneration condition exists.

In another illustrative embodiment, an apparatus comprises a voltage sensor and a controller. The voltage sensor measures a voltage provided by a power supply to a motor to generate a voltage signal. The controller identifies an instantaneous voltage using the voltage signal received from the voltage sensor. The controller computes a new average voltage for the motor using the instantaneous voltage, a previously computed average voltage, and a weight factor for the instantaneous voltage. The controller compares a difference between the new average voltage and the instantaneous voltage to a selected threshold to determine whether a regeneration condition exists. The controller controls operation of the motor such that a duty cycle of the motor does not decrease in response to a determination that the regeneration condition exists.

In yet another illustrative embodiment, a method is provided for controlling an electric motor in an aircraft to manage regeneration. A voltage signal is received from a voltage sensor measuring voltage provided by a power supply to the electric motor. An instantaneous voltage is identified from the voltage signal. A new average voltage is computed using the instantaneous voltage, a previously computed average voltage, and a weight factor for the instantaneous voltage. A determination is made as to whether a regeneration condition exists based on a difference between the instantaneous voltage and the new average voltage. A rate limiter for a duty cycle of the electric motor is adjusted to prevent the duty cycle from decreasing in an undesired manner when it is determined that the regeneration condition exists.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a motor system in the form of a block diagram in accordance with an illustrative embodiment;

DETAILED DESCRIPTION

The illustrative embodiments take into account different considerations. For example, the illustrative embodiments take into account that it may be desirable to effectively manage regeneration for an electric motor without needing to add hardware components to the electrical motor. In particular, the illustrative embodiments take into account that the rail voltage measurements made by voltage sensors associated with electric motors may be used to manage regeneration. Regeneration may be managed by ensuring that the duty cycle of the motor is not decreased during the regeneration condition to allow for the correction of the regeneration condition.

Thus, the illustrative embodiments provide a method and apparatus for controlling an electric motor to manage regeneration. In one illustrative example, an instantaneous voltage for a motor is measured using a voltage sensor. A new average voltage is computed for the motor using the instantaneous voltage, a previously computed average voltage, and a weight factor for the instantaneous voltage. The new average voltage is compared to a selected threshold to determine whether a regeneration condition exists. Operation of the motor is controlled such that a duty cycle of the motor does not decrease in response to a determination that the regeneration condition exists. In particular, operation of the motor is controlled such that the duty cycle is not allowed to decrease until the regeneration condition no longer exists.

Figure 1:
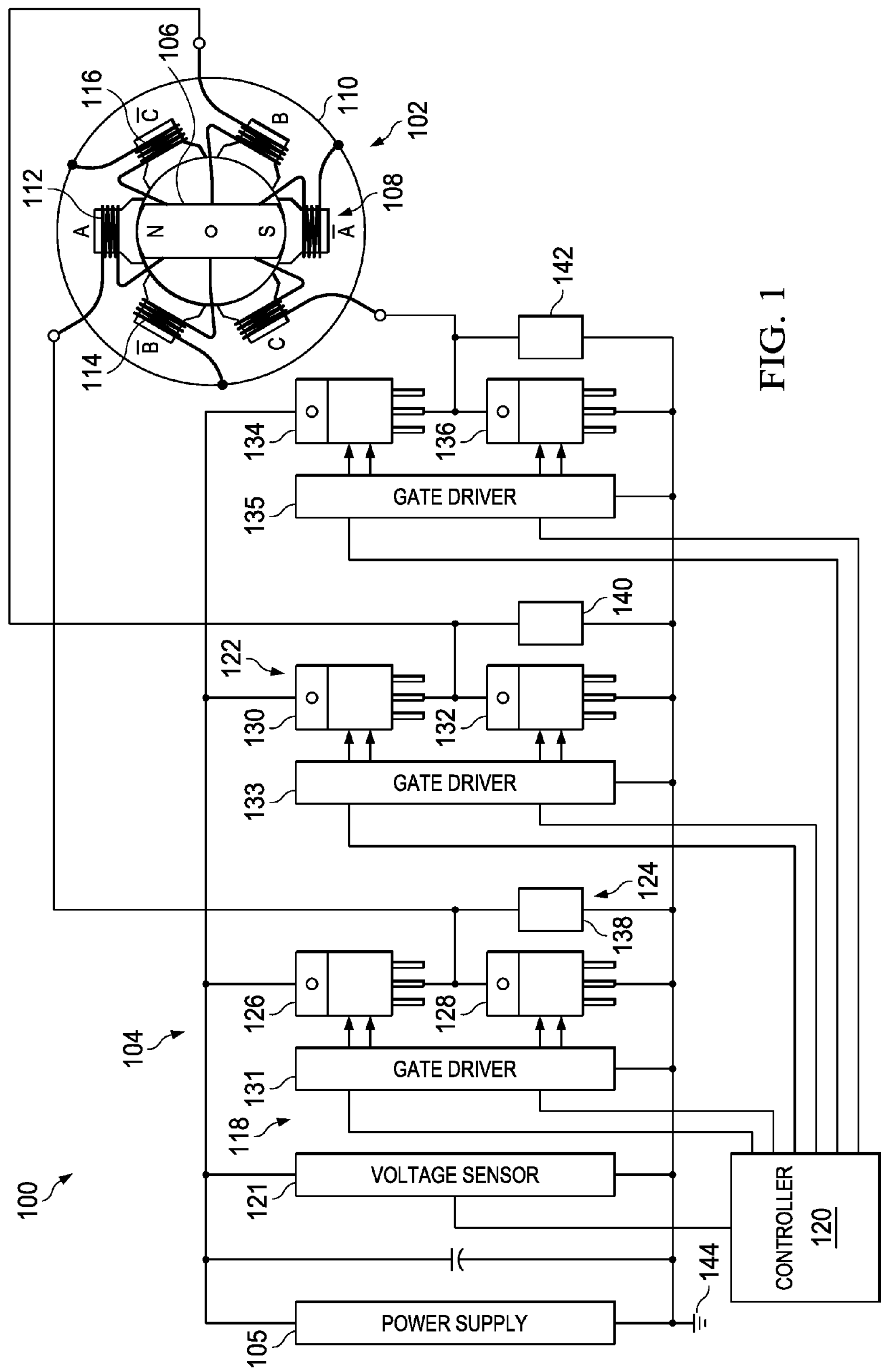
FIG. 1 is an illustration of a motor system in accordance with an illustrative embodiment.

Referring now to the figures and, in particular, with reference to FIG. 1, an illustration of a motor system is depicted in accordance with an illustrative embodiment. In this illustrative example, motor system 100 includes motor 102 and sensorless commutation system 104.

Motor 102 is an electric motor in this illustrative example. In particular, motor 102 is a brushless direct current (BLDC) motor having three phases. Power supply 105 provides power to motor 102. In this illustrative example, power supply 105 takes the form of a direct current power source.

Motor 102 includes rotor 106, stator 108, and plurality of windings 110. In this illustrative example, plurality of windings 110 includes first winding 112, second winding 114, and third winding 116. Each of these windings corresponds to a different phase for motor 102.

As depicted, sensorless commutation system 104 is connected to motor 102. In particular, sensorless commutation system 104 connects to plurality of windings 110. Sensorless commutation system 104 includes electrical circuit 118, which is connected to motor 102, and controller 120.

Electrical circuit 118 includes voltage sensor 121, inverter 122 and voltage measurement system 124. Voltage sensor 121 measures a voltage for motor 102 during the operation of motor 102. As depicted, the measured voltage may be a rail voltage. Rail voltage is the voltage provided by power supply 105. Controller 120 uses the rail voltage measurements provided by voltage sensor 121 to manage regeneration. In particular, controller 120 ensures that the duty cycle of motor 102 is not decreased during a regeneration condition and that the duty cycle is not decreased until after the regeneration condition no longer exists.

Inverter 122 is used to control the commutation of motor 102. In particular, inverter 122 controls the timing of commutation for motor 102. As depicted, inverter 122 includes transistor 126, transistor 128, transistor 130, transistor 132, transistor 134, and transistor 136. In this illustrative example, each of transistor 126, transistor 128, transistor 130, transistor 132, transistor 134, and transistor 136 takes the form of a metal-oxide semiconductor field-effect transistor.

In this illustrative example, inverter 122 also includes gate driver 131, gate driver 133, and gate driver 135. These gate drivers may control when the various transistors of inverter 122 are switched to an on state and switched to an off state.

Voltage measurement system 124 is used to measure the voltage at each of plurality of windings 110. As depicted, voltage measurement system 124 includes voltage divider 138, voltage divider 140, and voltage divider 142. Voltage divider 138, voltage divider 140, and voltage divider 142 are connected to first winding 112, second winding 114, and third winding 116, respectively. Further, each of voltage divider 138, voltage divider 140, and voltage divider 142 is connected to ground 144.

Voltage divider 138 measures the voltage at first winding 112. Voltage divider 140 measures the voltage at second winding 114. Voltage divider 142 measures the voltage at third winding 116.

In this illustrative example, controller 120 uses the voltage measured at each of plurality of windings 110 to compute a back electromotive force for each of the three phases of motor 102. For example, controller 120 may compute a first back electromotive force for the first phase of motor 102, a second back electromotive force for the second phase of motor 102, and a third back electromotive force for the third phases of motor 102.

Controller 120 then uses the first back electromotive force, the second back electromotive force, and the third back electromotive force to compute an overall back electromotive force. In this manner, controller 120 may use one or more digital algorithms to compute overall back electromotive force based on the voltages measured by voltage measurement system 124. Thus, the quantity of hardware components used to control the commutation of motor 102 may be reduced, thereby reducing the overall weight of motor system 100.

Controller 120 generates a result based on the overall back electromotive force. The result may have either a first value or a second value. For example, without limitation, controller 120 may generate the result having the first value when the overall back electromotive force is negative and having the second value when the overall back electromotive force is positive.

In this illustrative example, controller 120 uses the result generated to adjust both a commutation phase and a commutation period of motor 102. These adjustments affect how controller 120 controls gate driver 131, gate driver 133, and gate driver 135, thereby controlling when each of transistor 126, transistor 128, transistor 130, transistor 132, transistor 134, and transistor 136 is switched between an on state and an off state. Controlling the on state and the off state for each of these transistors controls commutation of motor 102.

Sensorless commutation system 104 is configured to provide improved phase alignment between the current in plurality of windings 110 and the overall back electromotive force. The output power of motor 102 may be maximized when this current and overall back electromotive force are aligned in phase. Further, sensorless commutation system 104 improves the timing of commutation.

The configuration of electric circuit 118 described above and the functions performed by controller 120 reduce the creation of surge currents and provide smoother current waveforms from commutation to commutation of motor 102. By reducing surge currents and providing smoother current waveforms between commutations, sensorless commutation system 104 may improve the efficiency of motor 102, help reduce the heat generated by motor 102, reduce or eliminate overcurrent, and increase the output power of motor 102. Further, the simple configuration of electric circuit 118 described above and the functions performed by controller 120 allow efficient sensorless commutation to be provided at a lower cost.

With reference now to FIG. 2, an illustration of a motor system is depicted in the form of a block diagram in accordance with an illustrative embodiment. In this illustrative example, motor system 200 includes motor 202, electric circuit 204, power supply 205, and controller 206. Motor system 100, motor 102, electric circuit 118, power supply

105, and controller 120 in FIG. 1 are examples of implementations for motor system 200, motor 202, electric circuit 204, power supply 205, and controller 206, respectively, in FIG. 2.

Motor 202 is an electric motor that may take different forms. Depending on the implementation, motor 202 may take the form of a brushless direct current motor, a permanent magnet synchronous motor, a reluctance motor, an alternating current (AC) inductance motor, or some other type of electric motor. Motor 202 may belong to an electromechanical system that is part of an aircraft, a watercraft, a spacecraft, a ground vehicle, or some other type of complex system or platform.

Power supply 205 provides power to motor 202. In some illustrative examples, power supply 205 is a direct current power supply. Power supply 205 may take the form of a battery, a system of batteries, or some other type of power source.

In one illustrative example, motor 202 has plurality of windings 208. For example, motor 202 may be a three-phase motor with three windings for the three different phases. In particular, the first phase may be phase A, the second phase may be phase B, and the third phase may be phase C.

Electric circuit 204 is connected to motor 202 and to controller 206. Electric circuit 204 includes voltage sensor 210. Voltage sensor 210 measures voltage 212 provided by power supply 205 to motor 202 and sends voltage signal 213 to controller 206. Voltage 212 may be a rail voltage, which is the voltage provided by power supply 205 to motor 202.

Controller 206 uses the measurements of voltage 212 contained in voltage signal 213 from voltage sensor 210 to manage regeneration of motor 202. For example, at a given point in time, controller 206 identifies instantaneous voltage 214 from voltage signal 213 received from voltage sensor 210. Instantaneous voltage 214 may also be referred to as an instantaneous rail voltage. Instantaneous voltage 214 may be a sample of voltage signal 213 at a particular point in time.

Controller 206 computes new average voltage 216 for motor 202 using instantaneous voltage 214, previously computed average voltage 218, and weight factor 220 for instantaneous voltage 214. In some illustrative examples, previously computed average voltage 218 may be the previously computed average rail voltage for motor 202 based on a sampling history that starts when operation of motor 202 begins. In other illustrative examples, previously computed average voltage 218 may be the previously computed average rail voltage for motor 202 based on a sampling history of a predefined size. For example, previously computed average voltage 218 may be the average voltage for N number of samples of voltage signal 213 received from voltage sensor 210. The N samples may be 5 samples, 10 samples, 20 samples, 50 samples, 100 samples, or some other number of samples. The number, N, selected may also be based on the sampling rate, R. For example, without limitation, N may be larger when the sampling rate, R, is faster. Similarly, N may be smaller when the sampling rate, R, is slower.

In one illustrative example, controller 206 computes new average voltage 216 using the following equation:

$$V_{newavg}=[V_{prevavg}*(1-W)]+[V_{inst}*W] \quad (1)$$

where $V_{newavg}$ is new average voltage 216, $V_{prevavg}$ is previously computed average voltage 218, W is weight factor 220, and $V_{inst}$ is instantaneous voltage 214.

Controller 206 computes difference 222 between new average voltage 216 and instantaneous voltage 214. Controller 206 compares difference 222 to selected threshold 224 to determine whether regeneration condition 226 exists. Selected threshold 224 is selected based on the capabilities and characteristics of power supply 205.

If difference 222 is greater than selected threshold 224, then controller 206 determines that regeneration condition 226 exists. When regeneration condition 226 exists, instantaneous voltage 214 may be higher than desired, thereby indicating an overvoltage in power supply 205.

In response to a determination that regeneration condition 226 exists, controller 206 controls operation of motor 202 to correct for this regeneration. In particular, controller 206 controls duty cycle 228 of motor 202. For example, controller 206 prevents duty cycle 228 from decreasing while regeneration condition 226 exists. As one illustrative example, a rate limiter for duty cycle 228 may be adjusted to prevent any reduction in duty cycle 228. By preventing a decrease in duty cycle 228, the speed of motor 202 is controlled to allow sufficient time for the correction of the regeneration. By preventing duty cycle 228 from decreasing, the speed of motor 202 is prevented from increasing during regeneration condition 226.

In other illustrative examples, in response to a determination that regeneration condition 226 exists, duty cycle 228 may be allowed to decrease but the rate at which duty cycle 228 decreases may be slowed. In other words, in response to a determination that regeneration condition 226 exists, controller 206 may set a deceleration rate for duty cycle 228 to zero.

Further, in response to a determination that regeneration condition 226 exists, controller 206 adjusts weight factor 220. In one illustrative example, weight factor 220 is reduced such that future computations of new average voltage 216 are not contaminated by the overly high measurements of instantaneous voltage 214 that occur during regeneration. In particular, reducing weight factor 220 for instantaneous voltage 214 places more weight on previously computed average voltage 218 than instantaneous voltage 214 in the computation of new average voltage 216.

As one illustrative example, weight factor 220 may be reduced from about 0.1 to about 0.05, or from about 0.12 to about 0.08. Reducing weight factor 220 in this manner ensures that controller 120 does not prematurely determine that regeneration condition 226 no longer exists when in actuality regeneration is still ongoing.

Weight factor 220 may be adjusted in different ways. In some cases, weight factor 220 may be switched from a first weight factor that is higher to a second weight factor that is lower in response to a determination that regeneration condition 226 exists. In other illustrative examples, weight factor 220 may be decreased based on an equation or algorithm that takes into account difference 222.

Controller 206 performs the process of computing new average voltage 216 and determining whether regeneration condition 226 exists for each sample of voltage signal 213 taken. When controller 206 determines that regeneration condition 226 no longer exists, duty cycle 228 may be allowed to decrease and weight factor 220 may be readjusted. For example, weight factor 220 may be switched back to a higher weight factor or a default weight factor.

In some illustrative examples, electric circuit 204 and controller 206 may also form sensorless commutation system 230. For example, electric circuit 204 may include inverter 232 and voltage measurement system 234, both of which are connected to plurality of windings 208 and ground. Inverter 122 and voltage measurement system 124 in FIG. 1 may be examples of implementations for inverter 232 and voltage measurement system 234, respectively, in FIG. 2.

In one illustrative example, inverter 232 takes the form of a three-phase inverter. For example, without limitation, inverter 232 may include three pairs of transistors connected in a half-bridge configuration in electric circuit 204 to form a three-phase inverter. Inverter 232 controls the timing of commutation for motor 202.

Voltage measurement system 234 is connected to inverter 232 and motor 202. Voltage measurement system 234 is used to measure the voltage at each of plurality of windings 208. In one illustrative example, voltage measurement system 234 may include first voltage divider 236, second voltage divider 238, and third voltage divider 240, each of which is referenced to ground.

First voltage divider 236 measures first phase voltage 242 for motor 202, second voltage divider 238 measures second phase voltage 244 for motor 202, and third voltage divider 240 measures third phase voltage 246 for motor 202. Controller 206 uses these phase voltages to compute overall back electromotive force 247 (Vbemf). In particular, controller 206 uses first phase voltage 242, second phase voltage 244, and third phase voltage 246 as inputs into an algorithm that outputs overall back electromotive force 247.

In one illustrative example, controller 206 performs the following computations:

$$Vas=Va-[(Vb+Vc)/2]; \quad (2)$$

$$Vbs=Vb-[(Va+Vc)/2]; \quad (3)$$

$$Vcs=Vc-[(Va+Vb)/2]; \quad (4)$$

where Va is first phase voltage 242, Vb is second phase voltage 244, Vc is third phase voltage 246, Vas is a first back electromotive force, Vbs is a second back electromotive force, and Vcs is a third back electromotive force.

Controller 206 uses the first back electromotive force, the second back electromotive force, and the third back electromotive force to determine overall back electromotive force 247. In particular, controller 206 may select one of the first, second, and third back electromotive forces to be overall back electromotive force 247 having a positive or negative sign based on the current commutation state of motor 202.

For example, inverter 232 may provide six-step commutation of motor 202. In other words, motor 202 may have six commutation states. Controller 206 may make the following selections:

$$\text{Commutation state } A\text{-}B \rightarrow Vbemf=Vcs; \quad (5)$$

$$\text{Commutation state } B\text{-}A \rightarrow Vbemf=-Vcs; \quad (6)$$

$$\text{Commutation state } B\text{-}C \rightarrow Vbemf=Vas; \quad (7)$$

$$\text{Commutation state } C\text{-}B \rightarrow Vbemf=-Vas; \quad (8)$$

$$\text{Commutation state } A\text{-}C \rightarrow Vbemf=Vbs; \text{ and} \quad (9)$$

$$\text{Commutation state } C\text{-}A \rightarrow Vbemf=-Vbs. \quad (10)$$

The computation of overall back electromotive force 247 by controller 206 using the algorithm described above may be performed for both low duty cycles and high duty cycles. For example, without limitation, the algorithm described above may work well for duty cycles ranging between about 8 percent and about 100 percent.

Once overall back electromotive force 247 has been computed, controller 206 generates result 248 having either first value 250 or second value 252 based on overall back electromotive force 247. For example, without limitation, when overall back electromotive force 247 is negative, first value 250 for result 248 may be a negative one (−1). Further, when overall back electromotive force 247 is positive, first value 252 for result 248 may be a positive one (+1).

Controller 206 uses result 248 to adjust commutation phase 254 and commutation period 256 of motor 202. In one illustrative example, controller 206 uses result 248 to update phase counter 258 and period adjustment 260. For example, depending on the value of phase counter 258, phase counter 258 may be either incremented or decremented. More specifically, when result 248 has first value 250 due to overall back electromotive force 247 not being positive, phase counter 258 may be decremented by 1. When result 248 has second value 252 due to overall back electromotive force 247 being positive, phase counter 258 may be incremented by 1. Phase counter 258 determines commutation phase 254 of motor 202.

Further, controller 206 updates period adjustment 260 based on result 248. In one illustrative example, controller 206 subtracts result 248 from the current value of period adjustment 260 to update period adjustment 260. In this manner, when overall back electromotive force 247 is not positive, period adjustment 260 is increased. Conversely, when overall back electromotive force 247 is positive, period adjustment 260 is decreased. Period adjustment 260 may be added to commutation period 256 to adjust commutation period 256, thereby forming a new commutation period.

These adjustments of commutation phase 254 and commutation period 256 of motor 202 improve the timing of commutation for motor 202. In particular, these adjustments are used to control the operation of inverter 232, to thereby control when motor 202 commutates.

Sensorless commutation system 230 provides a system for commutating motor 202 that more closely aligns the motor winding current with overall back electromotive force 247. In this manner, the output power of motor 202 may be increased.

In these illustrative examples, controller 206 may be implemented in software, hardware, firmware, or a combination thereof. When software is used, the operations performed by controller 206 may be implemented using, for example, without limitation, program code configured to run on a processor unit. When firmware is used, the operations performed by controller 206 may be implemented using, for example, without limitation, program code and data and stored in persistent memory to run on a processor unit.

When hardware is employed, the hardware may include one or more circuits that operate to perform the operations performed by controller 206. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

The illustration of motor system 200 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
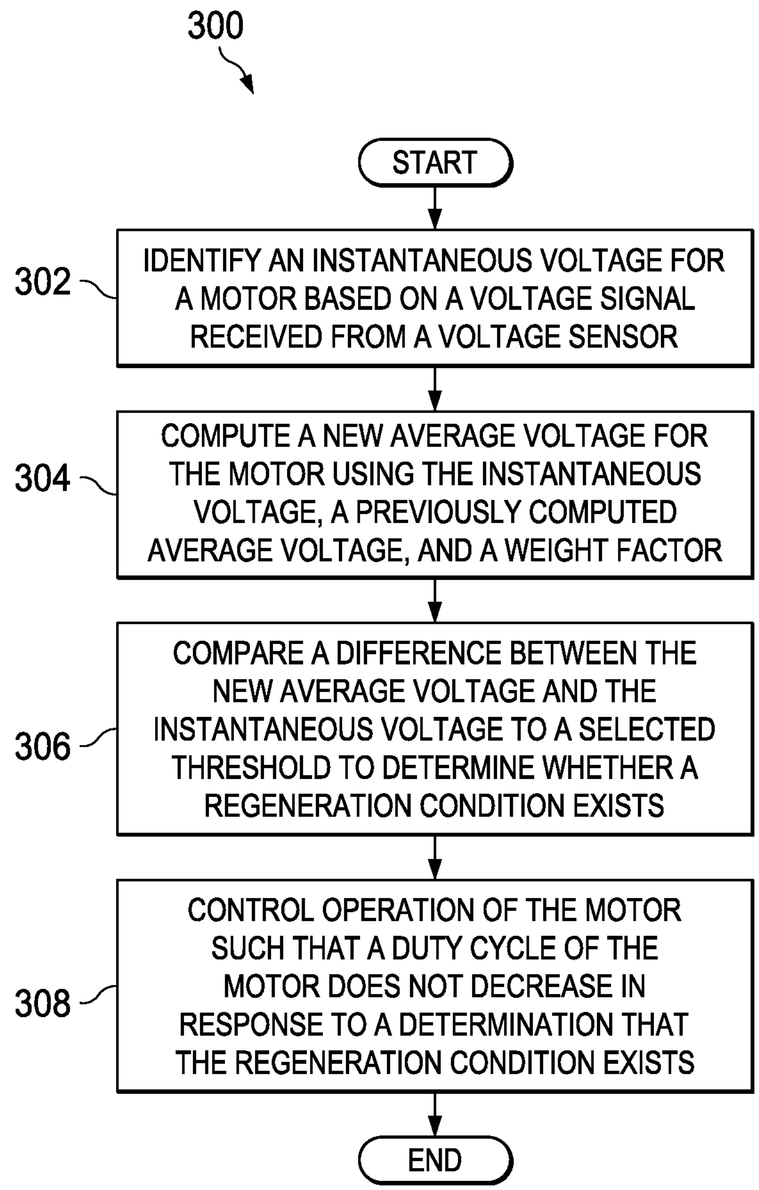
FIG. 3 is an illustration of a process for controlling an electric motor to manage regeneration in the form of a flowchart in accordance with an illustrative embodiment.

With reference now to FIG. 3, an illustration of a process for controlling an electric motor to manage regeneration is depicted in the form of a flowchart in accordance with an illustrative embodiment. Process 300 illustrated in FIG. 3 may be implemented using controller 206 in FIG. 2 to control motor 202 in FIG. 2.

Process 300 begins by identifying an instantaneous voltage for a motor based on a voltage signal received from a voltage sensor (operation 302). The instantaneous voltage may be an instantaneous rail voltage. Next, a new average voltage is computed for the motor using the instantaneous voltage, a previously computed average voltage, and a weight factor (operation 304).

In operation 304, the new average voltage may be computed by weighting both the previously computed voltage and the instantaneous voltage. For example, the new average voltage may be computed as follows:

$$V_{newavg}=[V_{prevavg}*W_{xx}]+[V_{inst}*W] \quad (11)$$

where $V_{newavg}$ is the new average voltage, $V_{prevavg}$ is the previously computed average voltage, W is the weight factor, $V_{inst}$ is instantaneous voltage, and $W_{xx}$ is an average weight factor. The average weight factor $W_{xx}$, which is the weight factor applied to the previously computed average voltage, may be, for example, without limitation, set to equal 1−W.

A difference between the new average voltage and the instantaneous voltage is compared to a selected threshold to determine whether a regeneration condition exists (operation 306). Operation of the motor is controlled such that a duty cycle of the motor does not decrease in response to a determination that the regeneration condition exists (operation 308), with process 300 terminating thereafter.

Figure 4:
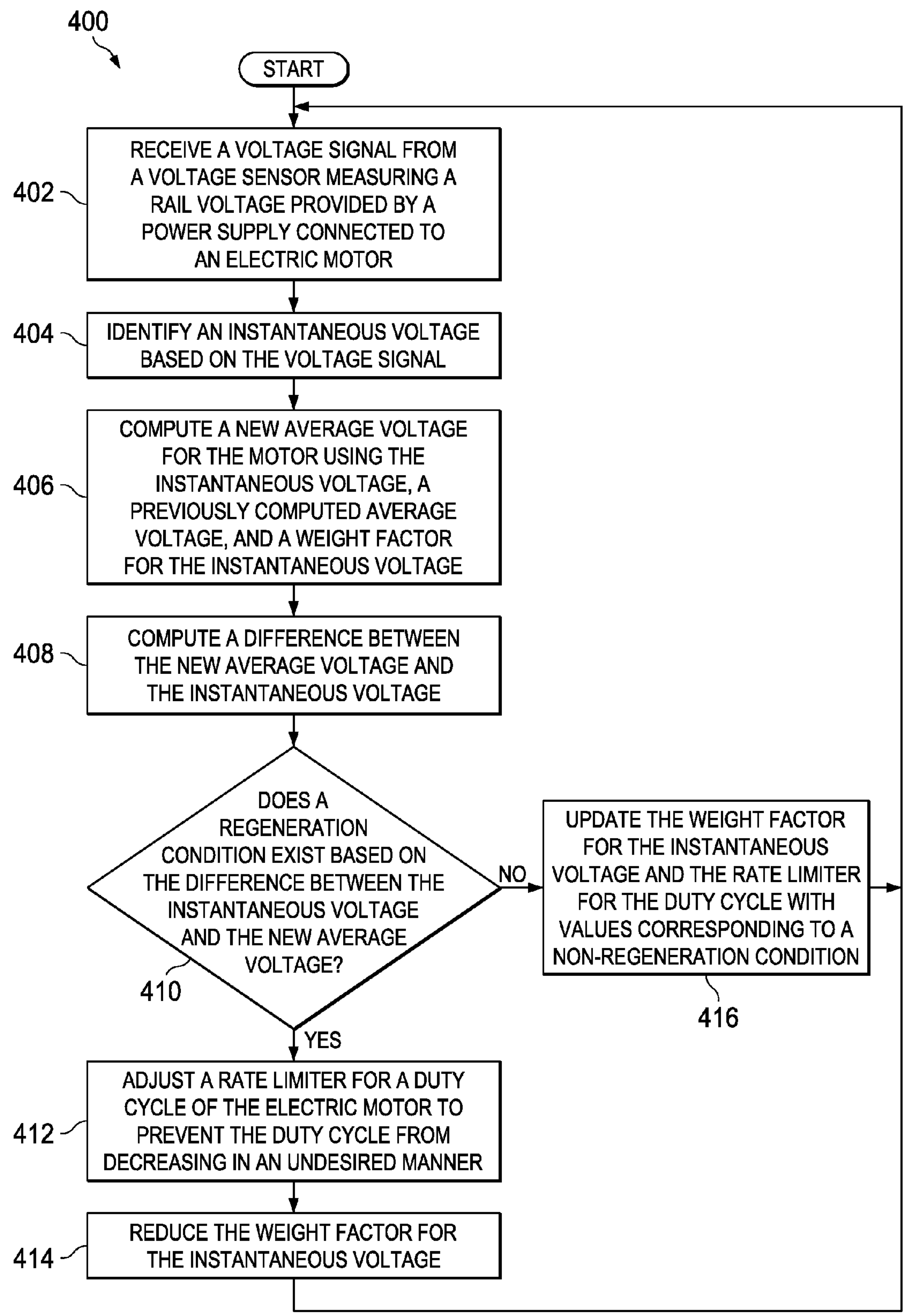
FIG. 4 is an illustration of a process for controlling an electric motor to manage regeneration in the form of a flowchart in accordance with an illustrative embodiment.

With reference now to FIG. 4, an illustration of a process for controlling an electric motor to manage regeneration is depicted in the form of a flowchart in accordance with an illustrative embodiment. Process 400 illustrated in FIG. 4 may be implemented using controller 206 in FIG. 2 to control motor 202 in FIG. 2.

Process 400 begins by receiving a voltage signal from a voltage sensor measuring a rail voltage provided by a power supply connected to an electric motor (operation 402). An instantaneous voltage is then identified based on the voltage signal (operation 404). In operation 404, the instantaneous voltage may be a sample of the voltage signal.

Next, a new average voltage is computed for the motor using the instantaneous voltage, a previously computed average voltage, and a weight factor for the instantaneous voltage (operation 406). A difference between the new average voltage and the instantaneous voltage is computed (operation 408).

A determination is then made as to whether a regeneration condition exists based on the computed difference between the new average voltage and the instantaneous voltage (operation 410). In operation 410, the regeneration condition may be indicated as existing when the difference is greater than a selected threshold that is selected based on the capabilities and characteristics of the power supply. If the difference is not greater than the selected threshold, then the regeneration condition does not exist. Rather, a non-regeneration condition exists.

If the regeneration condition exists, a rate limiter for a duty cycle of the electric motor is adjusted to prevent the duty cycle from decreasing in an undesired manner (operation 412). In operation 412, the duty cycle may be prevented from decreasing using, for example, a rate limiter. In one illustrative example, the rate limiter is used to limit the rate at which the duty cycle decreases. The rate limiter may be set to a lower rate. Depending on the implementation, this lower rate may be zero such that the duty cycle may not be allowed to decrease.

Next, the weight factor for the instantaneous voltage is reduced (operation 414). In operation 414, reducing the weight factor for the instantaneous voltage effectively increases the time constant for the next iteration and thereby, next computation of the new average voltage. Process 400 then returns to operation 402 described above.

With reference again to operation 410, if the difference is not greater than the selected threshold, the weight factor for the instantaneous voltage and the rate limiter for the duty cycle are updated with values corresponding to a non-regeneration condition (operation 416). In operation 416, the weight factor and the rate limiter may already be at these values. In some cases, the weight factor may need to be increased or switched to a higher value and the rate limiter may need to be set to a higher rate. Process 400 then proceeds to operation 402 described above.

Figure 5:
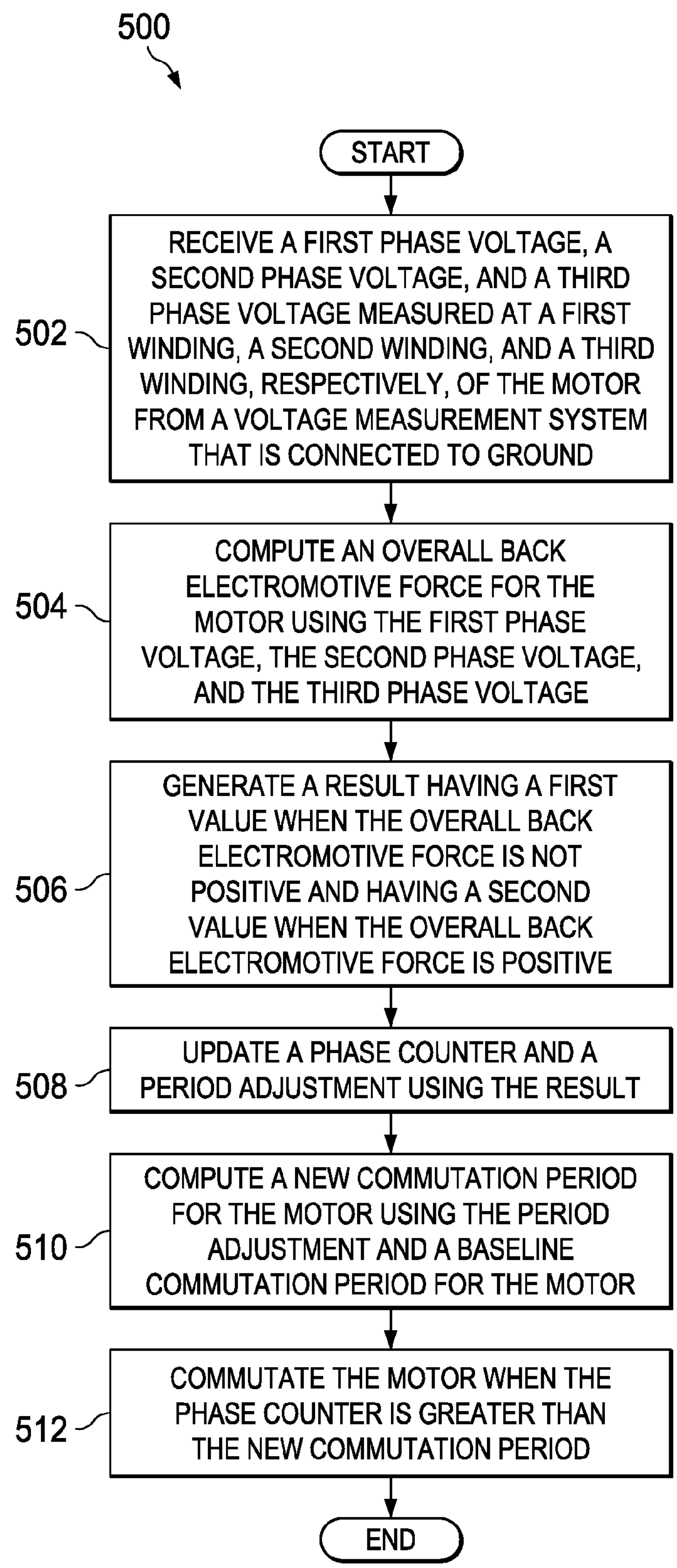
FIG. 5 is an illustration of a process for performing sensorless commutation of a motor in the form of a flowchart in accordance with an illustrative embodiment.

With reference now to FIG. 5, an illustration of a process for performing sensorless commutation of a motor is depicted in the form of a flowchart in accordance with an illustrative embodiment. Process 500 illustrated in FIG. 5 may be implemented using sensorless commutation system 230, which includes electric circuit 204, in FIG. 2.

Process 500 may begin by receiving a first phase voltage, a second phase voltage, and a third phase voltage motor measured at a first winding, a second winding, and a third winding, respectively, of the motor from a voltage measurement system that is connected to ground (operation 502). Next, an overall back electromotive force for the motor is computed using the first phase voltage, the second phase voltage, and the third phase voltage (operation 504).

A result is generated having a first value when the overall back electromotive force is not positive and having a second value when the overall back electromotive force is positive (operation 506). Thereafter, a phase counter and a period adjustment are updated using the result (operation 508).

In operation 508, the phase counter is used to control whether the commutation phase for the motor is lagged or advanced. For example, without limitation, operation 508 may be performed by, for example, without limitation, adjusting the phase counter by the value of the result. As one illustrative example, when the overall back electromotive force is positive, the phase counter may be incremented by 1 to cause the commutation phase to advance. When the overall back electromotive force is not positive, the phase counter may be decremented by 1 to cause the commutation phase to lag. In some cases, a selected constant may also be added to the phase counter as part of the update step. The selected constant may be, for example, 32, 34, 35, 68, or some other constant.

The period adjustment is used to track the result generated in operation 506 over time. For example, in operation 508, the period adjustment may be updated by subtracting the result generated in operation 506 from the current value of the period adjustment. In particular, when the overall back electromotive force is positive, the period adjustment is updated to cause an increase in the commutation period for the motor. Conversely, when the overall back electromotive force is not positive, the period adjustment is updated to cause a decrease in the commutation period for the motor.

A new commutation period for the motor is computed using the period adjustment and a baseline commutation period for the motor (operation 510). The motor is commutated when the phase counter is greater than the new commutation period (operation 512), with process 500 terminating thereafter. Process 500 may be repeated over a plurality of cycles of operation of the motor. The adjustments to the commutation phase and the commutation period made in process 500 ensure a more consistent timing for commutations, reduce the creation of surge currents, and provide smoother current waveforms between commutations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling regeneration for a motor, the method comprising:

identifying an instantaneous voltage provided by a power supply to the motor using a sample of a voltage signal received from a voltage sensor;

computing a new average voltage for the motor using the instantaneous voltage and a previously computed average voltage, wherein the previously computed average voltage is based on a plurality of previous samples of the voltage signal, wherein a weight factor, obtained by a controller, is used in computing the new average voltage, wherein the weight factor is adjusted by the controller to be a lower value in response to a determination that a regeneration condition existed in the previously computed average voltage, and wherein the controller computes the new average voltage using the following equation:

$$V_{newavg}=[V_{prevavg}*(1-W)]+[V_{inst}*W],$$

where $V_{newavg}$ is the new average voltage, $V_{prevavg}$ is the previously computed average voltage, W is the weight factor, and $V_{inst}$ is the instantaneous voltage;

comparing a difference between the new average voltage and the instantaneous voltage to a selected threshold;

determining that the regeneration condition exists when the difference between the new average voltage and the instantaneous voltage is greater than the selected threshold; and controlling operation of the motor by adjusting a rate limiter for a duty cycle of the motor to prevent the duty cycle from decreasing in an undesired manner in response to a determination that the regeneration condition exists.

2. The method of claim 1 further comprising:

repeating the steps of identifying the instantaneous voltage, computing the new average voltage, comparing the difference between the new average voltage and the instantaneous voltage to the selected threshold, determining that the regeneration condition exists, and controlling operation of the motor using another sample of the voltage signal received from the voltage sensor.

3. The method of claim 1 further comprising:

computing the difference between the instantaneous voltage and the new average voltage.

4. The method of claim 1, wherein controlling operation of the motor comprises:

setting the rate limiter for the duty cycle to zero in response to the determination that the regeneration condition exists.

5. The method of claim 1, wherein controlling operation of the motor comprises:

setting the rate limiter for the duty cycle to a lower rate in response to the determination that the regeneration condition exists.

6. The method of claim 1, wherein identifying the instantaneous voltage comprises:

sampling the voltage signal to obtain the instantaneous voltage, wherein the voltage signal measures a rail voltage provided by the power supply to the motor.

7. An apparatus comprising:

a voltage sensor that measures a voltage provided by a power supply to a motor to generate a voltage signal; and a controller that:

identifies an instantaneous voltage using a sample of the voltage signal received from the voltage sensor;

computes a new average voltage for the motor using the instantaneous voltage and a previously computed average voltage, wherein the previously computed average voltage is based on a plurality of previous samples of the voltage signal, wherein a weight factor, obtained by the controller, is used in computing the new average voltage, wherein the weight factor is adjusted by the controller to be a lower value in response to a determination that a regeneration condition existed in the previously computed average voltage, and wherein the controller computes the new average voltage using the following equation:

$$V_{newavg}=[V_{prevavg}*(1-W)]+[V_{inst}*W],$$

where $V_{newavg}$ is the new average voltage, $V_{prevavg}$ is the previously computed average voltage, W is the weight factor, and $V_{inst}$ is the instantaneous voltage;

compares a difference between the new average voltage and the instantaneous voltage to a selected threshold;

determines that the regeneration condition exists when the difference between the new average voltage and the instantaneous voltage is greater than the selected threshold; and controls operation of the motor by adjusting a rate limiter for a duty cycle of the motor to prevent the duty cycle from decreasing in an undesired manner in response to a determination that the regeneration condition exists.

8. The apparatus of claim 7, wherein the controller:

identifies the instantaneous voltage, computes the new average voltage, compares the difference between the new average voltage and the instantaneous voltage to the selected threshold, determines that the regeneration condition exists, and controls operation of the motor using another sample of the voltage signal received from the voltage sensor.

9. The apparatus of claim 7, wherein the controller sets the rate limiter for the duty cycle to zero in response to the determination that the regeneration condition exists.

10. The apparatus of claim 7, wherein the controller sets the rate limiter for the duty cycle to a lower rate in response to the determination that the regeneration condition exists.

11. The apparatus of claim 7, wherein the motor is an electric motor.

12. The apparatus of claim 11, wherein the electric motor is selected from one of a brushless direct current motor, a permanent magnet synchronous motor, a reluctance motor, and an alternating current inductance motor.

13. The apparatus of claim 7, wherein the power supply is a battery.

14. The apparatus of claim 7, wherein the motor belongs to an electromechanical system of one of an aircraft, a watercraft, a spacecraft, or a ground vehicle.

15. A method for controlling an electric motor in an aircraft to manage regeneration, the method comprising:

receiving a voltage signal from a voltage sensor measuring voltage provided by a power supply to the electric motor;

identifying an instantaneous voltage from a sample of the voltage signal;

computing a new average voltage using the instantaneous voltage and a previously computed average voltage, wherein the previously computed average voltage is based on a plurality of previous samples of the voltage signal, wherein a weight factor, obtained by a controller, is used in computing the new average voltage, wherein the weight factor is adjusted by the controller to be a lower value in response to a determination that a regeneration condition existed in the previously computed average voltage, and wherein the controller computes the new average voltage using the following equation:

$$V_{newavg}=[V_{prevavg}*(1-W)]+[V_{inst}*W],$$

where $V_{newavg}$ is the new average voltage, $V_{prevavg}$ is the previously computed average voltage, W is the weight factor, and $V_{inst}$ is the instantaneous voltage;

determining that the regeneration condition exists when a difference between the instantaneous voltage and the new average voltage is greater than a selected threshold; and adjusting a rate limiter for a duty cycle of the electric motor to prevent the duty cycle from decreasing in an undesired manner when it is determined that the regeneration condition exists.

16. The method of claim 15 further comprising:

repeating the steps of identifying the instantaneous voltage, computing the new average voltage, determining that the regeneration condition exists, and adjusting the rate limiter using another sample of the voltage signal received from the voltage sensor.

* * * * *